United States Patent [19]

Richie

[11] Patent Number: 4,809,089

[45] Date of Patent: Feb. 28, 1989

[54] PORTABLE VIDEO CASSETTE PLAYER

[76] Inventor: David C. Richie, 4482 Harvard, Detroit, Mich. 48224

[21] Appl. No.: 109,043

[22] Filed: Oct. 16, 1987

[51] Int. Cl.$^4$ .............................................. H04N 5/78
[52] U.S. Cl. ................................. 360/33.1; 358/254; 358/335
[58] Field of Search ............... 360/33.1; 358/254, 255, 358/335, 906, 909; 353/19, 47, 119

[56] References Cited

U.S. PATENT DOCUMENTS 3,702,721 11/1972 Skuja ..................................... 353/19
4,633,323 12/1986 Haberkern et al. .................. 358/254

OTHER PUBLICATIONS

"The Entertainment Center With Absolutely Nothing Left Out" *The Sharper Image Catalog,* Fall 1984.

*Primary Examiner*—Eugene R. LaRoche
*Assistant Examiner*—David Mis
*Attorney, Agent, or Firm*—Dale R. Small & Associates

[57] ABSTRACT

A truly portable video cassette player comprising only a video cassette detector including video cassette reel structure for receiving a video cassette having a video tape thereon and reeling and unreeling the video tape, audio detection structure including an audio pick up head located adjacent the video cassette reel structure for picking up audio signals from the video tape and providing an output for detected audio signals, and video detection structure including a video pick up head also positioned adjacent the video cassette reel structure for picking up video signals from the video tape and a video detector for receiving a detected video output signal from the video pick up head and providing a video output signal, structure for broadcasting the audio signal including an audio speaker and amplifying structure between the audio detector and audio speaker, video display structure including a video display device which may be either a cathode ray tube or a liquid crystal display, and a video control circuit positioned between the video display device and the video detector for controlling a visual display of the detected video signal, and a detachable portable power supply for supplying operating energy to the video cassette detector, broadcasting structure and video display structure, which energy is either AC/DC or AC electrical energy.

20 Claims, 1 Drawing Sheet

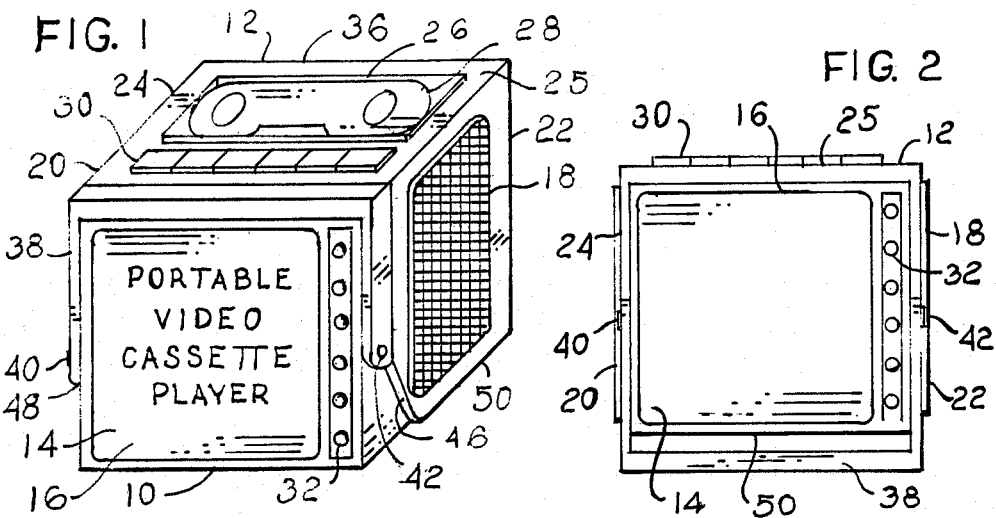
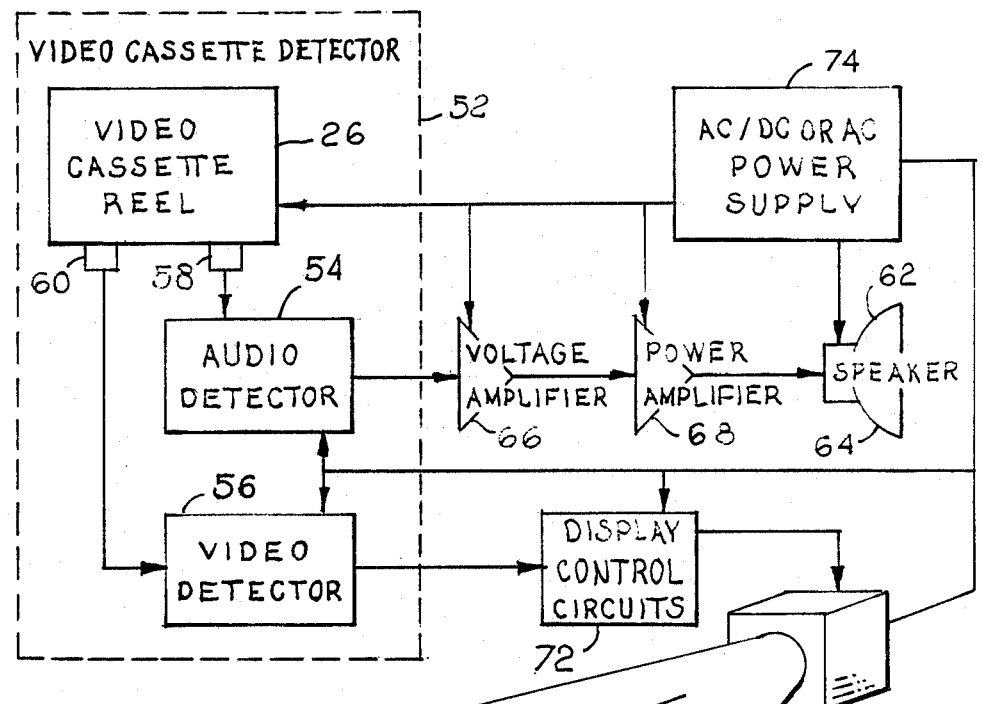
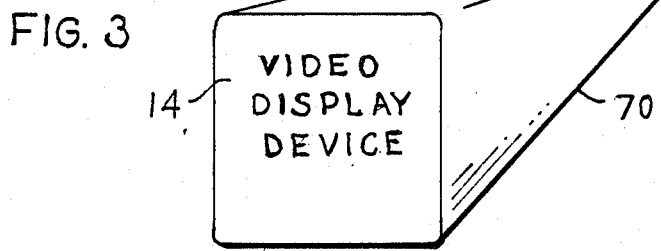

PORTABLE VIDEO CASSETTE PLAYER

BACKGROUND OF THE INVENTION

1. Field of the Invention

The invention relates to video cassettes, and refers more specifically to portable structure for playing prerecorded video cassettes, which structure includes a minimum number of components so as to be truly portable and inexpensive.

2. Description of the Prior Art

In the past, portable structure has been available for making video cassettes; thus, movie cameras are available which themselves are portable and which may be connected to or include devices for placing a visual electronic image recorded by the video cameras on video tape which may be subsequently played on stationary cassette players in conjunction with existing television sets and the like.

Further in conjunction with such cameras, there is sometimes provided apparatus for instant replay of stored visual images. Also, such cameras usually include structure for recording on the video tape synchronized audio signals. Such synchronized audio signals may also be instantly played back.

Also, there exist numerous video cassette recorders and players which are operable in conjunction with separate television sets or the like, which will permit playing of video cassettes to provide a video display. Such apparatus is not truly portable; further, there is combined with such apparatus much that is not necessary in a truly portable cassette player. Thus, the ability to record from a television set which also has the ability to receive transmitted television programs is not necessary in a portable video cassette player. Similarly, associated antennas and electronic structure associated with transmitted video and audio signals are not required in a portable video cassette player.

SUMMARY OF THE INVENTION

The portable video cassette player of the invention is a single unit in which only a video cassette detector, audio broadcast structure, video display structure and a portable power supply are included. Any other components add to the expense of the portable video cassette player and detract from the true portability of the portable video cassette player of the invention.

The portable video cassette player of the invention is readily transportable and is constructed and arranged to provide viewing of prerecorded video cassettes. Such structure allows playing of video cassettes while travelling, for example, on long automobile trips, on picnics, at the beach, and in remote locations where transmitted television signals are difficult or impossible to receive and where there is seldom a television set available with which a video cassette recorder/player may be used. The portable video cassette player of the invehtion also has many other uses, for example, as a sales tool in conjunction with specific prerecorded video cassettes having specialized material thereon.

BRIEF DESCRIPTION OF THE DRAWINGS

FIG. 1, is a diagrammatic perspective representation of the portable video cassette player of the invention.

FIG. 2, is a front view of the portable video cassette player shown in FIG. 1.

FIG. 3, is a partially diagrammatic, partially schematic diagram of the portable video cassette player shown in FIGS. 1 and 2.

DESCRIPTION OF THE PREFERRED EMBODIMENT

As shown best in FIG. 1, the portable video cassette player of the invention is constructed and arranged to be readily or truly portable. Further, the portable video cassette player 10 is constructed and arranged to include only a minimum number of components necessary to be efficient in only the playing of prerecorded video cassettes and is therefor particularly compact and economical.

Exteriorly, the portable cassette player as shown in FIGS. 1 and 2 includes an outer case 12, which may be generally rectangular and may be constructed of a combination of plastic and metal parts, as will be obvious to those in the art to which the invention pertains.

A video display device 14 provides a video display over substantially the entire front 16 of the portable video cassette player 10. As will be readily understood, the video display device 14 may be a cathode ray tube as shown in FIG. 3, or may be a liquid crystal display as shown in FIG. 1. The display device may provide video displays in black and while or color as desired, with attendant complexity of controls and circuitry known in the art to which the invention pertains.

Audio speakers 18 and 20 are provided at the opposite sides 22 and 24 of the portable video cassette player 10, as shown best in FIGS. 1 and 2. Again, the speakers 18 and 20 take up substantially the entire area of the sides 22 and 24, whereby speakers of sufficient size to give excellent audio fidelity may be utilized with the portable video cassette player 10, constructed and arranged as shown in FIG. 1.

Video cassette reel structure 26 provides top loading for a prerecorded video cassette 28. The usual controls 30, such as play, stop, fast forward, rewind, eject and pause are provided in conjunction with the video cassette reel 26 and are shown best in FIG. 1, positioned on the top 25 of the portable video cassette player 10, in front of the video cassette reel 26.

Required controls such as volume/on-off, focus, brightness and color controls 32 can be positioned on the front of the portable video cassette player 10 as shown in FIG. 1. Additional controls for the video display device 14, such as horizontal and vertidal hold as required, may be provided on the front 16 or the top 25 of the portable video cassette player 10.

The bottom 50 and back 36 of the portable video cassette player 10 are substantially flat to provide a surface to rest the cassette player on after carrying it and in use respectively. A cover (not shown) is provided in the back of the case 12 to permit access to a detachable portable power supply 74, which is considered in more detail subsequently.

A combination carrying handle and support 38 is secured to the sides 22 and 24 of the portable video cassette player 10 at the front thereof. The combination handle and support 38 as shown in FIGS. 1 and 2 is positioned adjacent the front surface 16 of the portable video cassette player 10. The combination handle and support 38 is set into the front, sides and top of the case 12 of the portable video cassette player 10, as shown best in FIG. 1, so as to be flush with the front, sides and top of the case 12 when in the stored position shown in FIG. 1.

On pivoting of the combination handle and support 38 into a horizontal position with the portable video cassette player as shown in FIG. 1, it is useable as a handle to carry the portable video cassette player 10. The pivot connections 40 and 42 as shown are positioned on the horizontal center of gravity of the portable video cassette player 10, as shown in FIG. 1. That is to say, with the combination handle and support 38 in a horizontal position, the center of gravity of the entire portable video cassette player 10 is in the horizontal plane of the combination handle and support 38, so that the portable video cassette player 10 will tend to hang direct-ly down or vertical from the handle and support 38 when carried with the handle and support 38.

As shown in FIG. 1, because of the bevelled surfaces 46 and 48 on the case 36 at sides 18 and 20, the combination handle and support 38 is allowed to pivot through slightly more than 180°. Further, the pivot structures 40 and 42 connecting the combination handle and support 38 to the case 12 are below the vertical center of the portable video cassette player 10, as shown in FIGS. 1 and 2, whereby the handle and support 38 extends beyond the bottom 50 of the portable video cassette player 10 in its position resting against the bevelled surfaces 46 and 48 as shown in FIG. 2. In the position of te handle and support 38 as shown in FIG. 2, it supports the portable video cassette player 10 in an inclined position for better viewing when set on a flat surface.

As particularly shown in FIG. 3, the portable video cassette player 10 internally includes a video cassette detector 52, which includes the video cassette reel 26 shown in FIG. 1, an audio detector circuit 54 and a video detector circuit 56. The audio detector 54 is connected to the video cassette reel 26 through an audio pick up head 58. In operation, the audio pick up head 58 picks up audio signals from a video cassette as the tape thereon is reeled and unreeled in the video cassette reel and passes the audio signal from the video cassette to the audio detector 54, which then provides a detected audio signal output.

The video detector 56 is similarly connected to receive a video signal from the video signal pick up head 60 and provides an output detected video signal. As shown in FIG. 3, the pick up heads 58 and 60 are positioned adjacent the video cassette reel in the usual manner to pick up the audio and video signals from the video tape in a video cassette within the video cassette reel structure 26.

The detected addio signal from the audio detector 54 is passed to audio broadcast structure 62, which includes a speaker 64 connected to the audio detector 54 through a voltage amplifier 66 and a power amplifier 68. The audio broadcast structure 62 provides an audible signal synchronized with the video display on the portable video cassette player 10 which video display is in accordance with the video signals on the prerecorded video tape in the video cassette 28.

The video display structure 70 as shown in FIG. 3 includes the cathode ray tube video display device 14 and the display control circuits 72. In operation, the detected video signals from the video detector 56 are received by the display control circuits 72 and are utilized to provide a video display on the cathode ray tube in accordance with the previously stored video signals on the tape of the video cassette 28.

A power supply 74 provides enough energy for all of the video cassette structure, audio display structure and the video display structure. The portable power supply 74 may be a detachable DC power supply from batteries or such devices as a cigarette lighter in an automobile. An AC power supply may be furnished from a household energy supply or the like. The power source is selectively direct current or alternating current.

While one embodiment of the present invention has been considered in detail, it will be understood that other embodiments and modifications as are defined by the appended claims are intended to be within the scope of the invention.

I claim:

1. A truly portable video cassette player comprising a video cassette detector for receiving a video cassette having a prerecorded video tape therein and detecting video and audio signals on the video tape, means for broadcasting the detected audio signals connected to the video cassette detector, means for displaying the detected video signals connected to the video cassette detector, and a portable power supply within the portable video cassette player connected to the video cassette detector, to the means for broadcasting the detected audio signals and to the means for displaying the detected video signals for providing operating energy therefore.

2. Structure as set forth in claim 1 wherein the video cassette detector includes a video cassette reel for winding an unwinding the prerecorded video tape on the video cassette, an audio detector and a pick up head positioned adjacent the video cassette reel for picking up an audio signal from the video tape as it is moved past the video head on reeling and unreeling the video tape and passing it through the audio detector and a video detector and a separate pick up head for picking up the video signal from the video tape as it is reeled and unreeled by the video cassette reel and passing it through the video detector.

3. Structure as set forth in claim 1 wherein the means for broadcasting the detected audio signals includes an audio detector and an audio pick up head positioned adjacent the video cassette reel for picking up an audio signal from the video tape as it is moved past the video pick up head connected to the audio detector.

4. Structure as set forth in claim 1 wherein the means for displaying the detected video signals includes a video pick up head positioned adjacent the video cassette reel for picking up the video signals from the video tape as it is moved past the video pick up head and a video detector for receiving the video signals from the video pick up head.

5. Structure as set forth in claim 1 wherein the means for broadcasting the detected audio signal comprises amplifying means and a speaker connected in series to receive the detected audio signal from the video cassette detector.

6. Structure as set forth in claim 1 wherein the means for displaying the detected video signal comprises a cathode ray tube and control means connected between the cathode ray tube and the video cassette detector for providing a visual display on the cathode ray tube from the detected video signal.

7. Structure as set forth in claim 1 wherein the means for visually displaying the detected video signal is a liquid crystal display and control means connected between the liquid crystal display and the video cassette detector for producing a visual display on the liquid crystal display from the detected video signal.

8. Structure as set forth in claim 1 wherein the portable power supply is a DC supply.

9. Structure as set forth in claim 1 wherein the portable power supply is an AC supply.

10. Structure as set forth in claim 1 wherein the portable power supply is an AC/DC or AC power supply.

11. Structure as set forth in claim 1 wherein the portable power supply is a detachable power supply.

12. Structure as set forth in claim 1 wherein the portable video cassette player further includes an outer case, a combination U-shaped handle and support set into the front, top and sides of the portable video cassette player outer case, and pivot means securing the handle and support to the outer case at the ends of the U-shaped handle and support.

13. Structure as set forth in claim 12 wherein the pivot means securing the U-shaped handle and support to the portable video cassette player are in the horizontal plane of the video cassette player which includes the center of gravity of the portable video cassette player.

14. Structure as set forth in claim 13 wherein the pivot means securing the U-shaped handle and support to the portable video cassette player are positioned below the horizontal center of the portable video cassette player to provide a support for one end of the portable video cassette player in one pivoted position thereof.

15. Structure as set forth in claim 14 and further including detent means operable between the case of the video cassette player and the combination handle and support in both its position recessed into the front, sides and top of the video cassette player case and in its pivoted position when utilized as a support for the portable video cassette player to inhibit movement of the combination handle and support.

16. A truly portable video cassette player which is self contained and includes only a video cassette detector for receiving a video cassette having a prerecorded video tape therein and providing a detected audio output signal from video tape and for providing a detected video output signal from the video tape, including a video cassette reel for receiving the video cassette therein and reeling and unreeling the video tape, audio detector means including an audio detector and an audio pick up head positioned adjacent the video cassette reel for picking up audio signals from the video tape as it is moved by the audio pick up head and passing the audio signals to the audio detector, and video detector means including a video detector and a video pick up head positioned adjacent the video cassette reel for picking up video signals from the video tape as it is moved by the video pick up head and passing them to the video detector, broadcast means connected to the audio detector for providing an audio output from detected audio signals from the audio detector including a speaker and amplifying means positioned between the audio detector and speaker for receiving the output audio signals from the audio detector and passing an amplified audio signal to the speaker, a cathode ray tube and control circuit means positioned between the cathode ray tube and the video detector for receiving output signals from the video detector and producing a video display of the detected video signals on the cathode ray tube, and at least one of a portable DC and AC power supply connected to the video cassette detector, broadcasting means and video display means for providing operating energy therefor.

17. A portable video cassette player including an outer case and a horizontal plane including the center of gravity of the video cassette player and a U-shaped combination handle and support inset into one end, both sides and the top of the outer case of the portable video cassette players and pivot means securing the ends of the U-shaped handle and support to the sides of the video cassette player.

18. Structure as set forth in claim 17 wherein the pivot means securing the combination handle and support to the outer case of the portable video cassette player are positioned in the horizontal plane of the video cassette player including the center of gravity of the video cassette player.

19. Structure as set forth in claim 17 wherein the pivot means securing the combination handle and support to the case of the portable video cassette player is positioned below the central horizontal plane of the portable video cassette player.

20. Structure as set forth in claim 19 and further including detent means operable between the case of the video cassette player and the combination handle and support in both its position recessed into the front, sides and top of the video cassette player case and in its pivoted position when utilized as a support for the portable video cassette player to inhibit movement of the combination handle and support.

* * * * *